May 7, 1940.  J. P. BERTRAND  2,200,018
PROCESS OF POLYCHROME PHOTOGRAPHY
Filed June 22, 1938
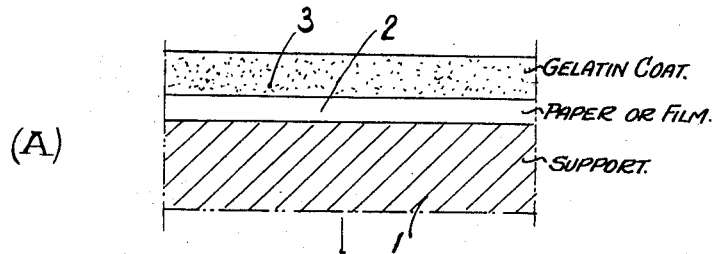
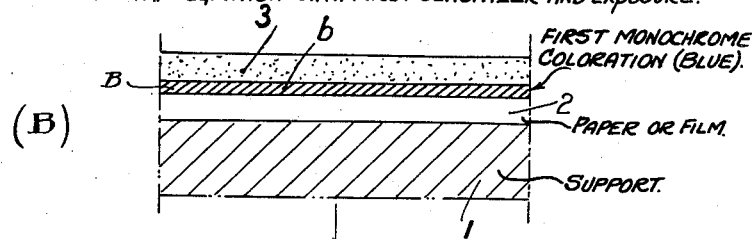
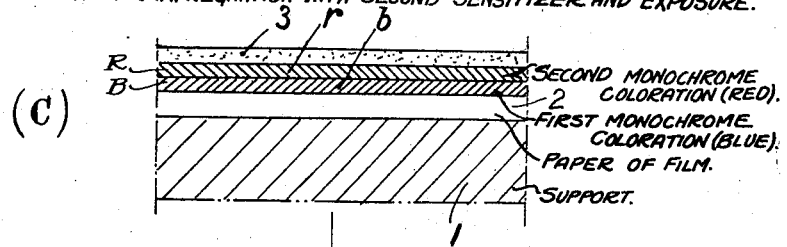
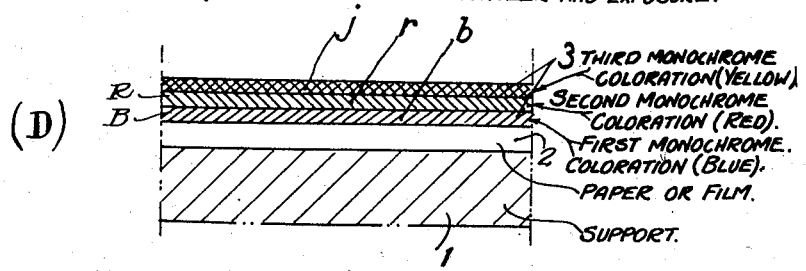
INVENTOR:
JEAN PIERRE BERTRAND
By: Alfred Müller
ATTORNEY.

Patented May 7, 1940

2,200,018

UNITED STATES PATENT OFFICE 2,200,018

PROCESS OF POLYCHROME PHOTOGRAPHY

Jean Pierre Bertrand, Paris, France

Application June 22, 1938, Serial No. 215,109
In France July 9, 1937

7 Claims. (Cl. 95—2)

The present invention has for its object to work up a process permitting the reproduction of coloured images by direct printing with an enlarger.

The object of the invention also is to make possible the printing of multiple colours on one single and same transparent support, said colours being however unable to penetrate or injure each other.

A way of performing the process in accordance with the invention explained hereafter, by way of example, is illustrated in the single figure of the appended drawing in which:

(A) is a sectional view of the support with the gelatine coat, before treatment, (B) to (D) are transverse sections of the support with the gelatine coat, said sections corresponding to the successive phases of the process.

In accordance with the invention a sheet 2 of flexible or rigid material, paper or film for instance, covered with a thick coat of gelatine 3 is first applied on a rigid support 1; then, a first solution is laid on said gelatine coat in order to obtain the blue coloration.

Said first solution is composed of 40 gr. of a copulation mixture of a diazosulfonate and a phenol, said mixture being diluted in 40 cm³ of alcohol, then completed with one litre of plain water.

The first solution thus composed impregnates deeply and homogeneously the gelatine.

A second solution is prepared by mixing 40 cm³ of caustic soda and 50 cm³ of sulforicinate of soda in presence of 500 gr. of water.

Said second solution is passed on the first one creating an alkaline medium which will permit the copulation by the light in a very short time.

In order to have the blue image formed especially in that part of the gelatine which is near the support, one dries the gelatine coat which is imbibed with the first solution, then said coat is washed with the second solution, dried again in order to leave the first solution of copulation in the depth of the gelatine only.

The whole preparation 1, 2 and 3 is then placed in an enlarger. The coat of gelatine 3 is thus exposed to the light with the interposition of the corresponding selected negative or of a colored negative and selecting with a suitable light. The copulation of the diazosulfonate and phenol takes place, which makes blue image B appear (B) of the figure.

The colored coat (b) corresponding to said image B lies in the thickness of the gelatine (C) of the figure.

After obtaining the image, the coat of gelatine is washed, for instance, with the caustic soda and sulforicinate solution which previously facilitated the copulation, or with soda silicate. The non-copulated parts are removed and the blue image B (B) of the figure, the colour of which is insoluble, is left.

In this way, the subsequent formation of the other colouring matters is permitted in the parts of the coat which are not coloured yet.

The blue image B thus being obtained and fixed, the coat of copulation is again impregnated, the constituents of the mixture being now selected in view of giving a red coloration.

The same previous operations are repeated; dilution in alcohol, addition of a sulforicinate of soda alkaline solution, drying and washing of the superficial coat, exposure to the light in the enlarger; fixing of the image by washing.

The red image (R) (C) of the figure is obtained in the red coloured coat in the gelatine.

At last, the above cycle of operations is begun again a third time, by first impregnating the coat of gelatine with a solution at 40 gr. of copulation mixture, the constituents of said mixture being selected in order to obtain a yellow coloration.

An image j (D) of the figure is obtained which is superposed to the two others, the result being stepped coloured coats in the coat of gelatine.

In the end, successive steps of colouring matters are obtained inside the coat, which permits said stepped colours to develop in a correct way without being badly influenced by the other colours.

Moreover, it is to be remarked that the trichromy operations are carried out in obtaining the blue first in the coat of gelatine, so that said blue, by occupying a part of said coat, which may be made more or less important, can protect same against the invading action of the red and yellow.

In the course of the exposure to the light in the enlarger, the coloration of the light used for printing the paper proofs is controlled, in order to control the gradation of the corresponding colouring matter and, further, the balance between the monochrome image obtained and the monochrome image which is subsequently formed.

This process offers many advantages. In particular, the humidity which impregnates the coat of gelatine increases greatly the sensitiveness and makes it possible to obtain direct photographic prints with the enlarger, rather than by contact.

Furthermore, the gelatine transparence gives the colours a greater deepness and richness of tone.

Said transparence main advantage lies in the possibility of making successive prints on one same support.

At last, the selection of the blue as the first colour circumscribes and limits the further action of the red and yellow and prevents these particularly energetic actions to become predominant.

The process in accordance with the invention can be worked up with the aid of diazosulfonate and phenol suitably selected. However, the mixture of antidiazosulfonate and of an arylid of oxynaphthoic 2-3 acid can be used to advantage.

The invention also relates, in the form of new industrial products, to the photographic images obtained.

Thus, the invention particularly relates to: (a) an image, the gelatine coat of which, offers stepped colouring matters, in such a manner that said colouring matters do not trouble one another in any way in their monochrome effect. (b) An image in accordance with the previous one and characterized by the fact that the blue colouring matter is on the face of the gelatine coat which is in contact with the paper.

Having now described my invention, what I claim as new and desire to secure by Letters Patent is:

1. Process of polychrome photography comprising applying a thick coat of gelatine upon a support, impregnating a first lamellar zone of the coat of gelatine next to the support with a first solution producing, when in the light, a first monochrome coloration; exposing the coat of gelatine to light with the interposition of a selected negative corresponding to said first coloration; washing the coat of gelatine; impregnating a second lamellar zone of the coat of gelatine next to the first lamellar zone with a second solution producing, when in the light, a second monochrome coloration; exposing the coat of gelatine to light with a selected negative interposed corresponding to said second coloration; and washing the coat of gelatine.

2. Process of polychrome photography comprising applying a thick coat of gelatine upon a support; completely impregnating the coat of gelatine with a first solution producing, in the light, a first monochrome coloration; washing the coat of gelatine, absorbing the humidity of the upper part of said coat; exposing the coat of gelatine to light with a selected negative interposed corresponding to said first coloration; washing the coat of gelatine completely impregnating the coat of gelatine with a second solution producing in the light a second monochrome coloration in the part of the coat of gelatine which is not transformed; absorbing the humidity of the upper part of said coat; exposing the coat of gelatine to light with a selected negative interposed corresponding to said second coloration; and washing the coat of gelatine.

3. Process of polychrome photography comprising applying a thick coat of gelatine upon a support; impregnating the coat of gelatine throughout its thickness with a solution containing a diazosulfonate, a phenol and other constituents intended for producing in the light a first monochrome coloration; washing the coat, absorbing the humidity of the upper part of said coat, exposing the coat of gelatine to light with a selected negative interposed corresponding to said first coloration; washing the coat of gelatine; impregnating the coat throughout its thickness with a second solution containing a diazosulfonate, a phenol and other constituents intended for producing in the light a second monochrome coloration in the part of the coat of gelatine which is not transformed; absorbing the humidity of the upper part of said coat; exposing the coat of gelatine to light with a selected negative interposed corresponding to said second coloration; and washing the coat of gelatine.

4. Process of polychrome photography comprising applying a thick coat of gelatine upon a support, impregnating said coat of gelatine with a solution containing a diazosulfonate, a phenol and other constituents intended for producing in the light a first monochrome coloration; exposing the coat of gelatine to light with a selected negative interposed corresponding to said first coloration; washing the coat of gelatine with a solution of caustic soda and sulforicinate of soda; impregnating the coat of gelatine with a second solution containing a diazosulfonate, a phenol and other constituents intended for producing, in the light, a second monochrome coloration; exposing the coat of gelatine to light with a selected negative interposed corresponding to said second coloration; and washing the coat of gelatine with a solution of caustic soda and sulforicinate of soda.

5. Process of polychrome photography comprising applying a thick coat of gelatine upon a support; initially impregnating said coat with a mixture of diazosulfonate, a phenol, alcohol and water; next impregnating said coat with a solution of caustic soda and sulforicinate of soda; drying the upper part of said coat to absorb humidity therefrom, exposing the coat of gelatine to light with a selected negative interposed corresponding to said first coloration; washing the coat of gelatine; impregnating on the whole of the non-transformed thickness the coat of gelatine with a mixture of diazosulfonate, phenol, alcohol and water; then impregnating the non-transformed thickness of the coat with a solution of caustic soda and sulforicinate of soda; exposing the coat of gelatine to light with a selected negative interposed corresponding to said second coloration; and washing the coat of gelatine.

6. Process of polychrome photography comprising applying a thick coat of gelatine upon a support; impregnating a first lamellar zone of the coat next to the support with a solution containing a diazosulfonate, a phenol and other constituents intended for producing, in the light, a blue coloration, exposing the coat of gelatine to light with a negative corresponding to said blue colour interposed, washing the coat of gelatine; impregnating a second lamellar part of the coat of gelatine next to the first lamellar part with a solution containing a diazosulfonate, a phenol and other constituents intended for producing, in the light, a red coloration, exposing the coat of gelatine to light with a negative corresponding to said red colour interposed; washing the coat of gelatine; impregnating a third lamellar part of the coat of gelatine next to the second lamellar part with a solution containing a diazosulfonate, a phenol and other constituents intended for producing in the light a yellow coloration; exposing the coat of gelatine to light with a negative corresponding to said yellow colour interposed; and washing the coat thus treated.

7. A process of polychrome photography comprising applying a thick coat of gelatine upon a support, impregnating said thick coat of gelatine with a first solution containing a mixture of an antidiazosulfonate, of an arylid of oxynaphthoic 2-3 acid and of constituents producing, in the light, a first monochrome coloration; exposing the coat of gelatine to light with a selected negative corresponding to said first coloration interposed; washing the coat of gelatine, impregnating the coat of gelatine with a second solution containing a mixture of antidiazosulfonate, an arylid of oxynaphthoic 2-3 acid and of constituents producing in the light, a second monochrome coloration; exposing the coat of gelatine to light with a selected negative corresponding to said second coloration interposed; and washing the coat of gelatine.

JEAN PIERRE BERTRAND.